US012526665B2

(12) United States Patent
Kim et al.

(10) Patent No.: US 12,526,665 B2
(45) Date of Patent: Jan. 13, 2026

(54) ELECTRONIC DEVICE FOR DETERMINING WHETHER TO SCAN A CHANNEL OF SPECIFIC FREQUENCY BAND AND METHOD FOR THE SAME

(71) Applicant: SAMSUNG ELECTRONICS CO., LTD., Suwon-si (KR)

(72) Inventors: Taeyong Kim, Suwon-si (KR); Hyunkee Min, Suwon-si (KR); Junsu Choi, Suwon-si (KR); Sungbin Min, Suwon-si (KR); Yeji Yoon, Suwon-si (KR); Junghun Lee, Suwon-si (KR); Seongsu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 634 days.

(21) Appl. No.: 17/964,478

(22) Filed: Oct. 12, 2022

(65) Prior Publication Data

US 2023/0096288 A1 Mar. 30, 2023

Related U.S. Application Data

(63) Continuation of application No. PCT/KR2022/013991, filed on Sep. 19, 2022.

(30) Foreign Application Priority Data

Sep. 28, 2021 (KR) ........................ 10-2021-0127887

(51) Int. Cl.
*H04W 24/08* (2009.01)
*H04W 48/16* (2009.01)

(52) U.S. Cl.
CPC .......... *H04W 24/08* (2013.01); *H04W 48/16* (2013.01)

(58) Field of Classification Search
None
See application file for complete search history.

(56) References Cited

U.S. PATENT DOCUMENTS 8,185,129 B2 5/2012 Alizadeh-Shabdiz
12,022,504 B2 * 6/2024 Gordaychik ........ H04W 72/542
(Continued)

FOREIGN PATENT DOCUMENTS

EP 3 142 426 B1 9/2019
KR 10-2014-0029143 3/2014
(Continued)

OTHER PUBLICATIONS

PCT International Search Report dated Dec. 26, 2022 for PCT/KR2022/013991.
(Continued)

*Primary Examiner* — Phirin Sam
(74) *Attorney, Agent, or Firm* — Nixon & Vanderhye P.C.

(57) ABSTRACT

In an electronic device and/or an operating method of the electronic device, the electronic device may include: a communication circuit configured to perform short-range wireless communication through a first frequency band and/or a second frequency band lower than the first frequency band; and a processor, wherein the processor may be configured to identify whether a channel in the first frequency band is a non-preferred scanning channel (non-PSC), based on reduced neighbor report (RNR) information included in a signal received through the second frequency band from an external electronic device, determine a quality of a signal to be received through the first frequency band, based on transmit power control (TPC) information received from the external electronic device upon identifying that the channel in the first frequency band is the non-PSC, and determine whether to perform an operation of scanning the non-PSC, based on whether a quality of a signal to be (Continued)

transmitted through the first frequency band satisfies a specified condition. In addition, various embodiments are possible.

20 Claims, 8 Drawing Sheets

(56) References Cited

U.S. PATENT DOCUMENTS

2005/0153736 A1 7/2005 Ganton
2016/0219617 A1 7/2016 Zhou et al.
2016/0262111 A1* 9/2016 Boudreau ........... H04W 52/383
2020/0112910 A1 4/2020 Cherian et al.
2020/0218426 A1* 7/2020 Ekambaram .......... A63F 13/216
2020/0280905 A1 9/2020 Gan et al.
2020/0344677 A1 10/2020 Cherian et al.
2021/0175957 A1* 6/2021 Raghavan ............ H04B 7/0452
2021/0227547 A1* 7/2021 Chitrakar .............. H04W 12/06
2021/0392571 A1 12/2021 Kneckt et al.
2021/0409095 A1* 12/2021 Zhang ................... H04L 5/0053
2022/0132494 A1* 4/2022 Kumar .................. H04W 72/21
2022/0225152 A1 7/2022 Schultz et al.
2022/0272544 A1 8/2022 Chitrakar et al.
2022/0338043 A1* 10/2022 Kazmi .................. H04W 24/10
2022/0345991 A1 10/2022 Changlani et al.
2022/0353821 A1* 11/2022 Wang ................ H04W 52/0235
2023/0164711 A1* 5/2023 Ma .................... H04W 72/1273
370/503
2023/0379801 A1* 11/2023 Siraj ..................... H04W 48/10

FOREIGN PATENT DOCUMENTS

KR 10-2021-0088690 A 7/2021
WO WO 2021-021016 A1 2/2021
WO WO 2023/054958 A1 4/2023

OTHER PUBLICATIONS

Notification of Publication dated Apr. 6, 2023 for PCT/KR2022/013991.

* cited by examiner

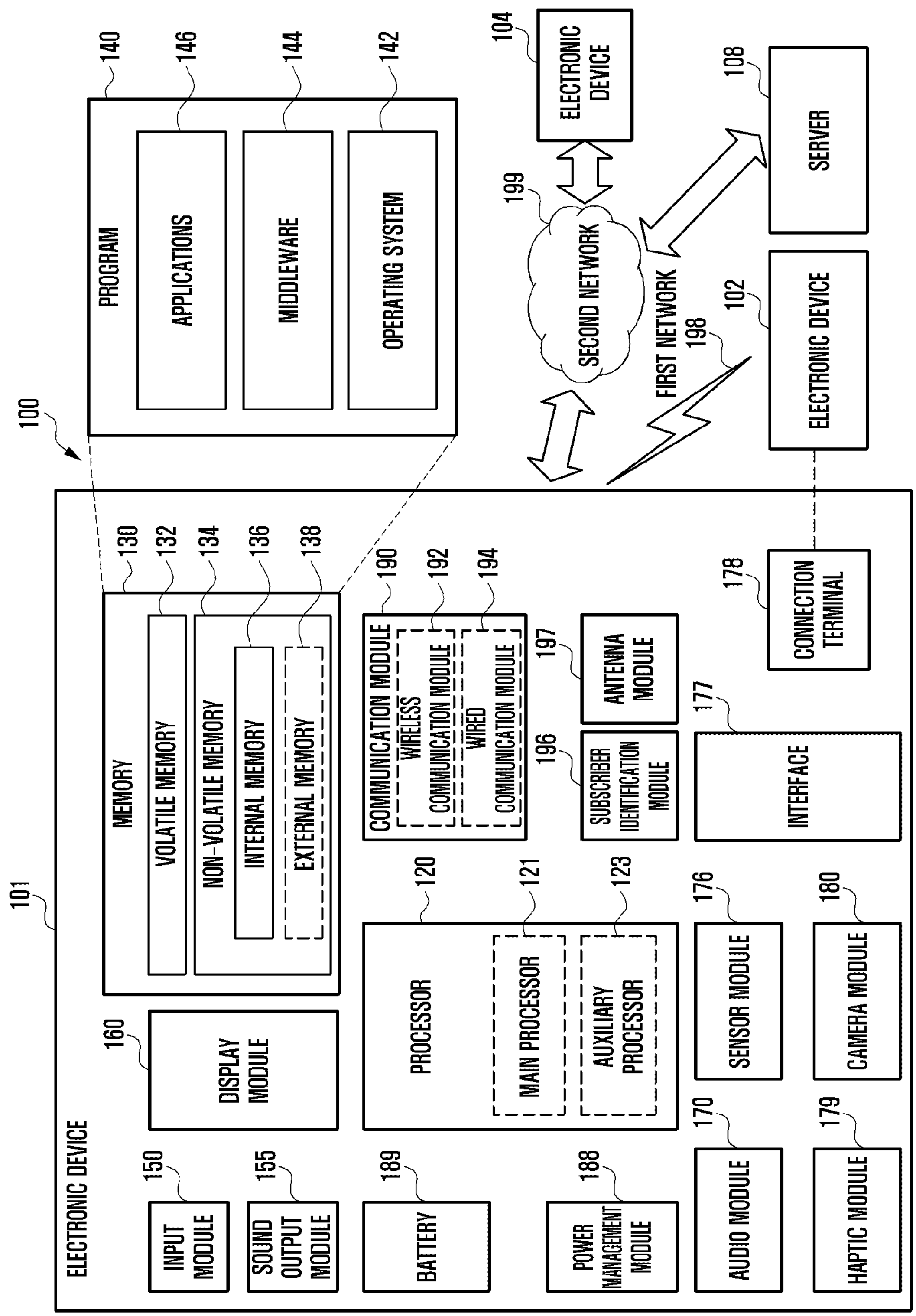
FIG. 1
100
101
ELECTRONIC DEVICE
INPUT MODULE
150
SOUND OUTPUT MODULE
155
DISPLAY MODULE
160
MEMORY
130
VOLATILE MEMORY
132
NON-VOLATILE MEMORY
134
INTERNAL MEMORY
136
EXTERNAL MEMORY
138
BATTERY
189
POWER MANAGEMENT MODULE
188
PROCESSOR
120
MAIN PROCESSOR
121
AUXILIARY PROCESSOR
123
COMMUNICATION MODULE
190
WIRELESS COMMUNICATION MODULE
192
WIRED COMMUNICATION MODULE
194
SUBSCRIBER IDENTIFICATION MODULE
196
ANTENNA MODULE
197
AUDIO MODULE
170
SENSOR MODULE
176
INTERFACE
177
HAPTIC MODULE
179
CAMERA MODULE
180
CONNECTION TERMINAL
178
PROGRAM
140
APPLICATIONS
146
MIDDLEWARE
144
OPERATING SYSTEM
142
SECOND NETWORK
199
FIRST NETWORK
198
ELECTRONIC DEVICE
104
SERVER
108
ELECTRONIC DEVICE
102

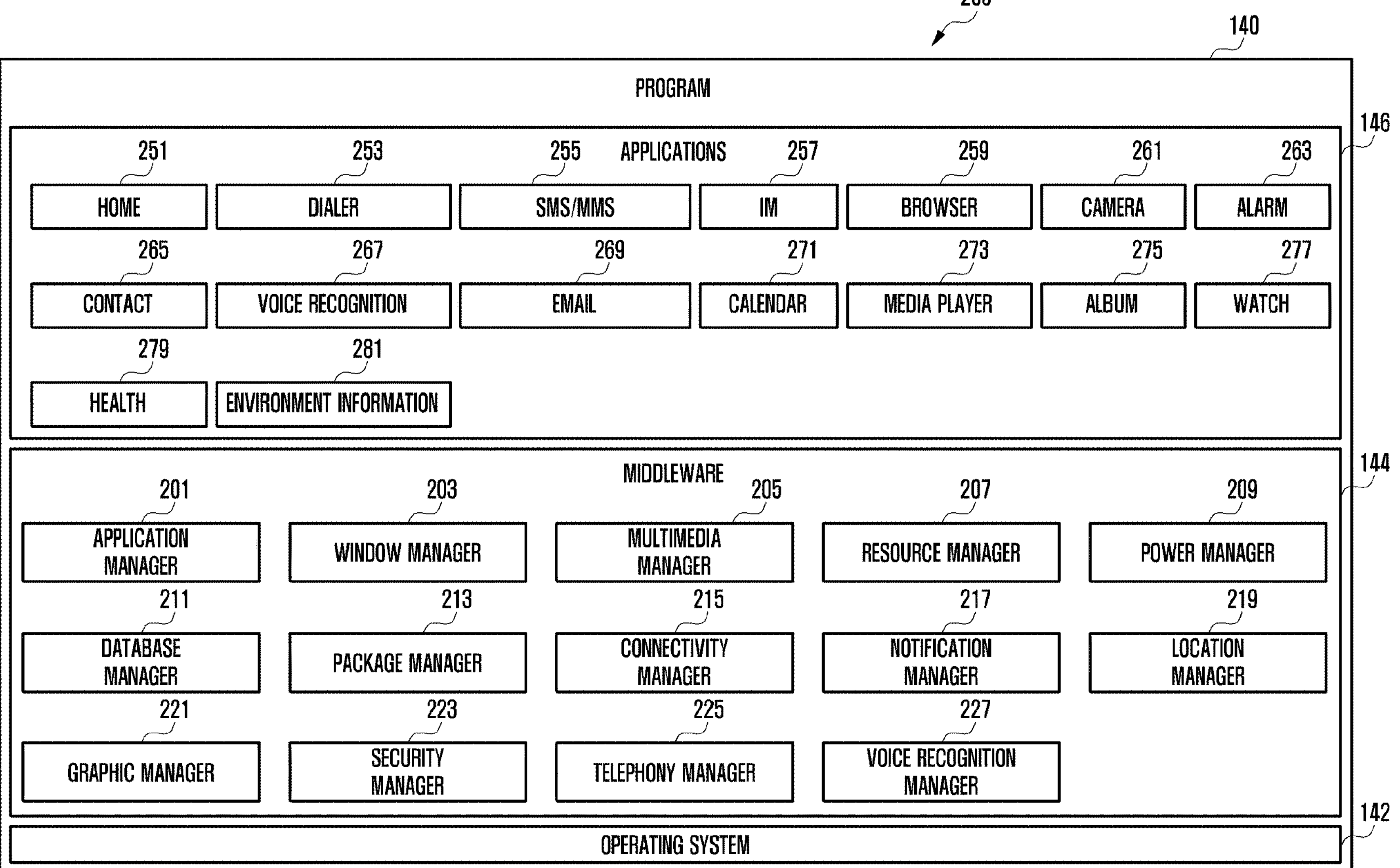
FIG. 2
200
140
PROGRAM
146
APPLICATIONS
251 HOME
253 DIALER
255 SMS/MMS
257 IM
259 BROWSER
261 CAMERA
263 ALARM
265 CONTACT
267 VOICE RECOGNITION
269 EMAIL
271 CALENDAR
273 MEDIA PLAYER
275 ALBUM
277 WATCH
279 HEALTH
281 ENVIRONMENT INFORMATION
144
MIDDLEWARE
201 APPLICATION MANAGER
203 WINDOW MANAGER
205 MULTIMEDIA MANAGER
207 RESOURCE MANAGER
209 POWER MANAGER
211 DATABASE MANAGER
213 PACKAGE MANAGER
215 CONNECTIVITY MANAGER
217 NOTIFICATION MANAGER
219 LOCATION MANAGER
221 GRAPHIC MANAGER
223 SECURITY MANAGER
225 TELEPHONY MANAGER
227 VOICE RECOGNITION MANAGER
142
OPERATING SYSTEM

ELECTRONIC DEVICE FOR DETERMINING WHETHER TO SCAN A CHANNEL OF SPECIFIC FREQUENCY BAND AND METHOD FOR THE SAME

CROSS-REFERENCE TO RELATED APPLICATIONS

This application is a continuation of International Application No. PCT/KR2022/013991 designating the United States, filed on Sep. 19, 2022, in the Korean Intellectual Property Receiving Office and claiming priority to Korean Patent Application No. 10-2021-0127887, filed on Sep. 28, 2021, in the Korean Intellectual Property Office, the disclosures of which are all hereby incorporated by reference herein in their entireties.

TECHNICAL FIELD

Various example embodiments relate to an electronic device and/or an operating method of an electronic device and, for example, to a technique for determining whether to scan a channel in a specific frequency band.

BACKGROUND

With wide use of various electronic devices, improvement in speed for wireless communication available for various electronic devices has been achieved. Among wireless communications supported by recent electronic devices, IEE 802.11 WLAN (or Wi-Fi) is a standard for implementing high-speed wireless connections on various electronic devices. Wi-Fi, which was first implemented, is capable of supporting a transmission rate of up to 1 to 9 Mbps, while Wi-Fi 6 technology (or IEEE 802.11ax) is capable of supporting a transmission rate of up to about 10 Gbps.

Electronic devices may support various services (e.g., a UHD video streaming service, an augmented reality (AR) service, a virtual reality (VR) service, and a mixed reality (MR) service) using relatively high-capacity data and may support various other services through wireless communication supporting a high transmission rate.

Wi-Fi 6, Wi-Fi 6 enhanced (E), or above-generation standards may support a high frequency band (e.g., 6 GHz or 7.25 GHz) compared to previous-generation standards (Wi-Fi 4 or Wi-Fi 5). The high frequency band may support a relatively large number of channels compared to the previous-generation standards.

For example, short-range wireless communication using a 2.4 GHz band may support 13 channels, and short-distance wireless communication using a 5 GHz band may support 25 channels. On the other hand, short-range wireless communication using a 6 GHz band may support 60 channels.

SUMMARY

To perform short-range wireless communication, an electronic device may perform a scan operation of retrieving an external electronic device (e.g., an access point) that transmits a signal (e.g., a beacon message or a probe response message) including information related to the short-range wireless communication. To perform the scan operation, the electronic device may perform an operation for receiving a signal in a frequency band corresponding to a specific channel. As the number of channels to be scanned increases, the electronic device may require more time for scanning.

When the time required for scanning increases, time required to complete connection through short-range wireless communication may increase, and the quality of a service requiring a low latency or a high data transmission rate may be reduced.

An electronic device according to various example embodiments may include: a communication circuit configured to perform short-range wireless communication through a first frequency band and/or a second frequency band lower than the first frequency band; and at least one processor, wherein the at least one processor may be configured to identify whether a channel in the first frequency band is a non-preferred scanning channel (non-PSC), based on reduced neighbor report (RNR) information included in a signal received via/through the second frequency band from an external electronic device, determine a quality of a signal to be received via/through the first frequency band, based on transmit power control (TPC) information received from (and/or transmitted by) the external electronic device upon identifying that the channel in the first frequency band is the non-PSC, and determine whether to perform an operation of scanning the non-PSC, based on whether a quality of a signal to be transmitted through the first frequency band satisfies a specified condition.

An electronic device according to various example embodiments may include: a communication circuit configured to perform short-range wireless communication through a first frequency band and/or a second frequency band lower than the first frequency band; and a processor, wherein the processor may be configured to identify whether a channel in the first frequency band is a non-preferred scanning channel (non-PSC), based on reduced neighbor report (RNR) information included in a signal received via/through the second frequency band from an external electronic device, determine a quality of a signal received via/through the second frequency band, upon identifying that the channel in the first frequency band is the non-PSC, and determine whether to perform an operation of scanning the channel, based on whether the quality of the signal received via/through the second frequency band satisfies a specified condition.

An operating method of an electronic device according to various example embodiments may include: identifying, from an external electronic device, whether a channel using a first frequency band is a non-preferred scanning channel (non-PSC), based on reduced neighbor report (RNR) information included in a signal received via/through a second frequency band from the external electronic device; determining a quality of a signal to be received via/through the first frequency band, based on transmit power control (TPC) information received from and/or transmitted by the external electronic device upon identifying that the channel is the non-PSC; and determining whether to perform scanning of the channel, based on whether a quality of a signal to be transmitted through the first frequency band satisfies a specified condition.

An electronic device and an operating method of the electronic device according to various example embodiments may determine (or estimate) the quality of a signal to be transmitted through a first frequency band, based on information related to short-range wireless communication received in an operation of scanning a channel in a second frequency band before scanning a channel in the first frequency band. Therefore, the electronic device may determine whether to scan the channel in the first frequency band, based on the determined quality, before scanning the channel in the first frequency band, thus reducing time taken for the scanning when not scanning the channel in the first frequency band.

An electronic device and an operating method of the electronic device according to various example embodiments may determine whether to scan a channel in a first frequency band, based on the quality of a signal received via/through a second frequency band before scanning the channel in the first frequency band. Therefore, the electronic device may determine whether to scan the channel in the first frequency band, based on the determined quality, before scanning the channel in the first frequency band, thus reducing time taken for the scanning when not scanning the channel in the first frequency band.

BRIEF DESCRIPTION OF DRAWINGS

The above and other aspects, features, and advantages of certain embodiments will be more apparent from the following detailed description, taken in conjunction with the accompanying drawings, in which:

FIG. 1 is a block diagram of an electronic device according to various example embodiments;

FIG. 2 is a block diagram of a program according to various embodiments;

DETAILED DESCRIPTION

Figure 3:
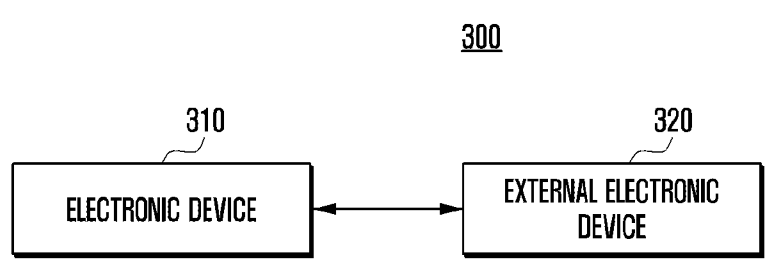
FIG. 3 illustrates an electronic device and an external electronic device according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

FIG. 3 illustrates an electronic device and an external electronic device according to various example embodiments.

Referring to FIG. 3, a wireless LAN system 300 may include an electronic device 310 and/or an external electronic device 320. According to an embodiment, the electronic device 310 may perform wireless communication with the external electronic device 320 through short-range wireless communication. The wireless communication may refer to various communication methods that both the electronic device 310 and/or the external electronic device 320 may support. For example, the wireless communication may be Wi-Fi. The external electronic device 320 may serve as a base station that provides wireless communication to at least one electronic device 310 located within a communication range of the wireless LAN system 300. For example, the external electronic device 320 may include an IEEE 802.11 access point (AP). The electronic device 310 may include an IEEE 802.11 station (STA).

The short-range wireless communication used by the electronic device 310 and/or the external electronic device 320 to exchange data may use various frequency bands including a first frequency band (e.g., 6 GHz), a second frequency band (e.g., 5 GHz), and/or a third frequency (e.g., 2.4 GHz). The electronic device 310 and/or the external electronic device 320 may establish a channel included in one frequency band among a plurality of frequency bands, and may exchange data using the established channel.

As part of a process of being connected to the external electronic device 320, the electronic device 310 may perform a scan process for retrieving the external electronic device 320 that broadcasts (or transmits) a signal in a specific frequency band (e.g., the second frequency band and/or the third frequency band) through the specific frequency band. The scan process may include at least one operation of an operation in which the electronic device 310 retrieves a signal (e.g., a beacon message) in the specific frequency band received from and/or transmitted by the external electronic device 320 or an operation in which the electronic device 310 broadcasts a signal (e.g., a probe message) in specific frequency band and the external electronic device 320 receives a response signal (e.g., a probe response message) corresponding to the probe message.

For example, the electronic device 310 may scan the external electronic device 320 broadcasting a signal (e.g., a beacon signal) in the first frequency band. The electronic device 310 may retrieve a signal in a frequency band corresponding to each of a plurality of channels in short-range wireless communication using the first frequency band.

In another example, the electronic device 310 may scan the external electronic device 320 broadcasting a signal (e.g., a beacon signal) in the second frequency band. The electronic device 310 may retrieve a signal in a frequency band corresponding to each of a plurality of channels in the short-range wireless communication using the second frequency band.

In still another example, the electronic device 310 may scan the external electronic device 320 broadcasting a signal (e.g., a beacon signal) in the third frequency band. The electronic device 310 may retrieve a signal in a frequency band corresponding to each of a plurality of channels in the short-range wireless communication using the third frequency band.

When the short-distance wireless communication is Wi-Fi, the number of channels using the first frequency band (e.g., 6 GHz) may be 60 (e.g., 15 preferred scanning channels (PSCs) for preferentially performing scanning and 45 non-PSCs having a low scan priority), the number of channels using the second frequency band (e.g., 5 GHz) may be 25, and the number of channels using the third frequency band (e.g., 2.4 GHz) may be 13.

While the electronic device 310 performs a scan, the electronic device 310 may entail an increase in time required for scanning and an increase in time required to establish the short-range wireless communication as the number of channels to be scanned increases. For example, time required for the electronic device 310 to retrieve the external electronic device 320 broadcasting the signal in the first frequency band may increase as compared to time required for the electronic device 310 to retrieve the external electronic device 320 broadcasting the signal in the second frequency band and/or the signal in the third frequency band.

Hereinafter, an embodiment enabling the electronic device 310 to quickly establish short-range wireless communication by reducing the time required to scan the external electronic device 320 in order to perform the short-range wireless communication will be described.

Figure 4:
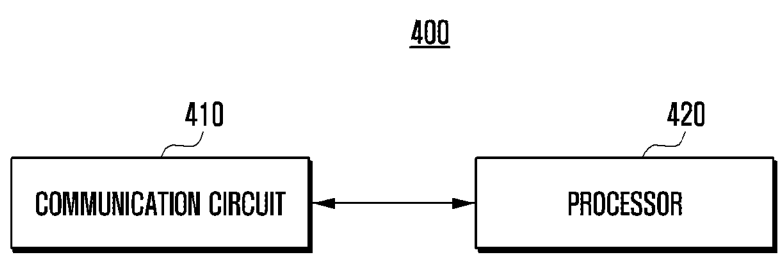
FIG. 4 is a block diagram of an electronic device according to various example embodiments.

FIG. 4 is a block diagram of an electronic device according to various example embodiments.

According to various example embodiments, an electronic device (e.g., the electronic device 310 of FIG. 3) may include a communication circuit (e.g., the wireless communication module 192 of FIG. 1) 410 and a processor (e.g., the processor 120 of FIG. 1) 420.

The communication circuit 410 may include various circuit structures used for modulation and/or demodulation of a signal in the electronic device 310. For example, the communication circuit 410 may modulate a signal in a baseband into a signal in a radio frequency (RF) band to output through an antenna (not shown), or may demodulate a signal in the RF band received via/through the antenna into a signal in the baseband and may transmit the signal to the processor 420.

The communication circuit 410 may perform short-range wireless communication through a first frequency band (e.g., 6 GHz), a second frequency band (e.g., 5 GHz) that is a lower frequency band than the first frequency band, and/or a third frequency band (e.g., 2.4 GHz) that is a lower frequency band than the second frequency band. The communication circuit 410 may be connected, directly or indirectly, to an external electronic device (e.g., the external electronic device 320 of FIG. 3) through a plurality of frequency bands including the first frequency band, the second frequency band, and/or the third frequency band, and may transmit data to the external electronic device 320 or may receive data transmitted from the external electronic device 320. The communication circuit 410 may perform an operation for receiving a signal transmitted from the external electronic device 310, based on control of the processor 420. The communication circuit 410 may receive a signal for requesting a scan of a specific channel from the processor 420, and may control components (e.g., a low-noise amplifier, a switch, and/or a filter) of the communication circuit 410 to receive a signal through a frequency band corresponding to the specific channel.

The processor 420 may receive data received from (and/or transmitted by) an application processor (e.g., the processor 120 of FIG. 1), and may generate a packet for transmitting the received data to the external electronic device 320. The processor 420 may be a communication processor (or communication processor) included in a communication module (e.g., the wireless communication module 192, including communication circuitry, of FIG. 1). According to an embodiment, the processor 420 may generate a packet by performing channel coding based on data transmitted by the application processor 120, may identify whether data transmitted by the external electronic device 320 at least partially has an error, or may perform an operation of recovering an error (e.g., hybrid auto repeat request (HARQ)) when the error has occurred. Each "module" herein may comprise circuitry.

The processor 420, comprising processing circuitry, may be operatively connected to the communication circuit 410 to control an operation of the communication circuit 410. The processor 420 may control the communication circuit 410 to perform a scan process for retrieving the external electronic device 320 that broadcasts (or transmits) a signal in a specific frequency band (e.g., the second frequency band and/or the third frequency band) through the specific frequency band as part of an operation of being connected, directly or indirectly, with the external electronic device 320 through the short-range wireless communication. Each "processor" herein comprises processing circuitry.

The scan process may include at least one operation of an operation in which the electronic device 310 retrieves a signal (e.g., a beacon message) in the specific frequency band received from and/or transmitted by the external electronic device 320 or an operation in which the electronic device 310 broadcasts a signal (e.g., a probe message) in specific frequency band and the external electronic device 320 receives a response signal (e.g., a probe response message) corresponding to the probe message.

As described above with reference to FIG. 3, considering that the number of channels using the first frequency band is greater than the number of channels using other frequency bands, the processor 420 may control the communication circuit 410 to scan the channels using the other frequency bands (e.g., the second frequency band and the third frequency band) before scanning the channels using the first frequency band.

In another example, the processor 420 may control the communication circuit 410 to scan the external electronic device 320 broadcasting a signal (e.g., a beacon signal) in the second frequency band. The communication circuit 410 may configure components (e.g., a low-noise amplifier and a filter) in the communication circuit 410 to receive the signal in the second frequency band, and may retrieve a signal in a frequency band corresponding to each of a plurality of channels in the short-range wireless communication using the second frequency band.

In still another example, the electronic device 310 may scan the external electronic device 320 broadcasting a signal (e.g., a beacon signal) in the third frequency band. The communication circuit 410 may configure components (e.g., a low-noise amplifier and a filter) in the communication circuit 410 to receive the signal in the third frequency band, and may retrieve a signal in a frequency band corresponding to each of a plurality of channels in the short-range wireless communication using the third frequency band.

The processor 420 may receive a signal (e.g., a probe response message or a beacon message) from the external electronic device 320 through a scan operation of the specific frequency band (e.g., the second frequency band and/or the third frequency band). The processor 420 may identify information related to short-range wireless communication included in the signal transmitted by the external electronic device 320.

The information related to the short-range wireless communication may include a reduced neighbor information (RNR) field. The RNR field may include channel information (e.g., a channel number) using a frequency band (e.g., the first frequency band) different from a frequency band (e.g., the second frequency band and/or a third frequency band) in which the information related to the short-range wireless communication is transmitted. The processor 420 may identify whether a channel using the first frequency band supported by the external electronic device 320 is a preferred scanning channel (PSC) or a non-preferred scanning channel (non-PSC), based on the channel information.

A plurality of PSCs using the first frequency band may be channels having a specified interval (e.g., 80 MHz) from a channel starting channel. For example, the channel number of a PSC using the first frequency band may be one of 5, 21, 37, 53, 69, 85, 101, 117, 133, 149, 165, 181, 197, and 213. The channel number of a non-PSC may be one of numbers other than 5, 21, 21, 37, 53, 69, 85, 101, 116, 133, 149, 165, 181, 197, and 213. The above channel numbers are examples, and may be changed depending on various reasons (e.g., a national policy).

In response to identifying that the channel using the first frequency band is a non-PSC, the processor 420 may determine whether to scan the channel using the first frequency band. In response to identifying that the channel using the first frequency band is a PSC, the processor 420 may determine to scan the channel using the first frequency band.

The electronic device 310 may measure the quality of a signal in the second frequency band transmitted by a first external electronic device 510 (e.g., external electronic device 510 in FIG. 5), and may identify whether the quality of the signal satisfies a specified condition. Alternatively, the electronic device 310 may determine (or estimate) the strength of a signal in the first frequency band transmitted by the first external electronic device 510, based on the quality of the signal in the second frequency band and TPC information included in the information related to the short-range wireless communication. "Based on" as used herein covers based at least on.

The processor 420 may add the bandwidth of the channel using the first frequency band as a frequency band to be scanned, based on identifying that the channel using the first frequency band is the PSC. The processor 420 may determine whether to scan the channel, based on identifying that the channel using the first frequency band is the non-PSC.

When determining whether to scan the channel using the first frequency band, the processor 420 may identify the quality of a signal received via/through a channel in the second frequency band. The quality of the signal may include a received signal strength indicator (RSSI).

The first frequency band may be a higher frequency band than the second frequency band. Since a signal having a relatively high frequency has greater attenuation than a signal having a relatively low frequency, a signal received via/through a channel in the first frequency band may have a lower quality than a signal received through a channel in the second frequency band. Since the processor 420 does not scan the channel using the first frequency band, the processor 420 may determine whether to scan a channel in the first frequency band, based on the quality of the signal received through the channel in the second frequency band.

The processor 420 may identify the quality of the signal received through the channel in the second frequency band, and may identify whether the quality of the signal satisfies the specified condition. The specified condition may include a condition that the quality of the signal is equal to or greater than (or exceeds) a specified value. For example, when identifying that the quality (e.g., −50 dBm) of the signal received through the channel in the second frequency band is equal to or greater than the specified value (e.g., −70 dBm), the processor 420 may determine that the quality of the signal satisfies the specified condition. In another example, when identifying that the quality (e.g., −80 dBm) of the signal received through the channel in the second frequency band is equal to or greater than the specified value (e.g., −70 dBm), the processor 420 may determine that the quality of the signal does not satisfy the specified condition.

The processor 420 may determine whether to scan the channel using the first frequency band, based on whether the quality of the signal satisfies the specified condition. When identifying that the quality of the signal satisfies the specified condition, the processor 420 may determine to scan the channel using the first frequency band. The processor 420 may add the frequency band of the channel (part of the first frequency band) to the frequency band to be scanned. When determining to scan the channel using the first frequency band, the processor 420 may configure components (e.g., a low-noise amplifier and a filter) of the communication circuit 410 to receive a signal in the first frequency band, and may retrieve a signal in the first frequency band transmitted by the external electronic device 320. The processor 420 may perform operations (e.g., authentication and/or association) related to establishment of a channel in the first frequency band, based on information related to short-range communication included in the signal in the first frequency band.

When identifying that the quality of the signal does not satisfy the specified condition, the processor 420 may determine not to scan the channel using the first frequency band. The processor 420 may scan frequency bands other than a frequency band corresponding to the channel using the first frequency band. The processor 420 may display an indicator indicating that the channel using the first frequency band is not scanned on a display (e.g., the display module 160 of FIG. 1).

When determining whether to scan the channel using the first frequency band, the processor 420 may determine (or estimate) the quality of a signal to be transmitted through the channel in the first frequency band.

The processor 420 may determine (or estimate) the quality of the signal to be transmitted through the first frequency band, based on the quality of the signal received through the second frequency band and the transmit power control (TPC) information included in the information related to the short-range wireless communication transmitted by the external electronic device 320.

The processor 420 may determine the reception strength (or quality) of the signal in the first frequency band, based on the output strength of the signal in the first frequency band that the electronic device 320 can maximally output and the path loss of the signal in the first frequency band. According to an embodiment, the processor 420 may determine the reception strength of the signal in the first frequency band using Equation 1.

$$RP_{6G}=TP_{6G}-PL_{6G} \quad \text{[Equation 1]}$$

($RP_{6G}$: Reception strength of signal in first frequency band, $TP_{6G}$: Maximum output strength of signal in first frequency band, $PL_{6G}$: Path loss of signal in first frequency band)

$RP_{6G}$ determined in Equation 1 may be the maximum or high reception strength of the signal in the first frequency band.

Since the processor 420 has not performed an operation of scanning the first frequency band, the processor 420 cannot receive the maximum or high output strength of the signal in the first frequency band from the external electronic device 320. Accordingly, the processor 420, comprising processing circuitry, may determine the maximum or high output strength of the signal in the first frequency band that the electronic device 400 can output as the maximum or high output strength of the signal in the first frequency band. The maximum or high output strength of the signal in the first frequency band may be determined according to a policy of a country where the electronic device 310 and the external electronic device 320 are located. For example, the electronic device 310 may follow a policy described below in Table 1. Referring to Table 1, in the country where the electronic device 310 is located, the electronic device 310 may determine a smaller value of an EIRP and/or a PSD as the maximum or high output strength, and may control the communication circuit 410 to output a signal using the determined maximum or large output strength. The electronic device 310 may store information related to the maximum or large output strength of a signal output by the communication circuit 410 in a memory (e.g., the memory 130 of FIG. 1). The processor 420 may identify the maximum output strength of the signal in the first frequency band with reference to the information related to the maximum output strength stored in the memory 130.

TABLE 1

| | | | Output strength | |
|---|---|---|---|---|
| Country | Mode | Frequency band | Effective isotropic radiated power (EIRP) | Power spectral density (PSD) |
| USA | Low power indoor (LPI) | 5.925 to 7.125 GHz | 24 dBm | −1 dBm/MHz |
| | Very low power (VLP) | 5.925 to 7.125 GHz | 14 dBm | −8 dBm/MHz |
| Korea | LPI | 5.925 to 7.125 GHz | 24 dBm | +2 dBm/MHz |
| | VLP | 5.925 to 6.425 GHz | 14 dBm | +1 dBm/MHz |
| Europe | LPI | 5.945 to 6.425 GHz | 23 dBm | +10 dBm/MHz |
| | VLP | 5.945 to 6.425 GHz | 14 dBm | +1 dBm/MHz |

The processor 420 may determine the path loss of the signal in the first frequency band, based on the path loss of the signal in the second frequency band, the first frequency band, and/or the second frequency band. For example, the processor 420 may determine the path loss of the signal in the first frequency band using Equation 2 illustrated below.

$$PL_{6G} = PL_{5G} + \left(10\log\left(\frac{4\pi df_{6G}}{c}\right)^2 - 10\log\left(\frac{4\pi df_{5G}}{c}\right)^2\right) = PL_{5G} + 20\log\left(\frac{f_{6G}}{f_{5G}}\right) \quad \text{[Equation 2]}$$

($PL_{6G}$: Path loss of signal in first frequency band, $PL_{5G}$: Path loss of signal in second frequency band, d: Distance between external electronic device 320 and electronic device 310, $f_{6G}$: Frequency in first frequency band, $f_{5G}$: Frequency in second frequency band)

The processor 420 may determine the path loss of the signal in the second frequency band, based on the difference between the output strength of the signal in the second frequency band and the reception strength of the signal in the second frequency band. A transmit power control (TPC) included in the information related to the short-range wireless communication transmitted by the external electronic device 320 may include the output strength of the signal in the second frequency band. The processor 420 may identify the output strength of the signal in the second frequency band, based on the TPC, and may determine the difference between the reception strength and the output strength of a signal in the second frequency band received by the electronic device 310 in as the path loss of the signal in the first frequency band.

The processor 420 may determine the path loss of the signal in the first frequency band, based on the determined path loss of the signal in the second frequency band and Equation 2. The processor 420 may determine (or estimate) the reception strength (or quality) of the signal in the first frequency band, based on the path loss of the signal in the first frequency band and the maximum output strength of the signal in the first frequency band.

The processor 420 may identify the quality of a signal that may be received through the channel in the first frequency band, and may identify whether the quality of the signal satisfies a specified condition. The specified condition may include a condition that the quality of the signal is equal to or greater than (or exceeds) a specified value. For example, when identifying that the quality (e.g., −50 dBm) of the signal that may be received through the channel in the first frequency band is equal to or greater than the specified value (e.g., −70 dBm), the processor 420 may determine that the quality of the signal satisfies the specified condition. In another example, when identifying that the quality (e.g., −80 dBm) of the signal that may be received through the channel in the first frequency band is equal to or lower than the specified value (e.g., −70 dBm), the processor 420 may determine that the quality of the signal does not satisfy the specified condition.

The processor 420 may determine whether to scan the channel using the first frequency band, based on whether the quality of the signal satisfies the specified condition. When identifying that the quality of the signal satisfies the specified condition, the processor 420 may determine to scan the channel using the first frequency band. The processor 420 may add the frequency band of the channel (part of the first frequency band) to the frequency band to be scanned. When determining to scan the channel using the first frequency band, the processor 420 may configure components (e.g., a low-noise amplifier and a filter) of the communication circuit 410 to receive a signal in the first frequency band, and may retrieve a signal in the first frequency band transmitted by the external electronic device 320. The processor 420 may perform operations (e.g., authentication and/or association) related to establishment of a channel in the first frequency band, based on information related to short-range communication included in the signal in the first frequency band.

When identifying that the quality of the signal does not satisfy the specified condition, the processor 420 may determine not to scan the channel using the first frequency band. The processor 420 may scan frequency bands other than a frequency band corresponding to the channel using the first frequency band. The processor 420 may display an indicator indicating that the channel using the first frequency band is not scanned on the display (e.g., the display module 160 of FIG. 1).

Figure 5:
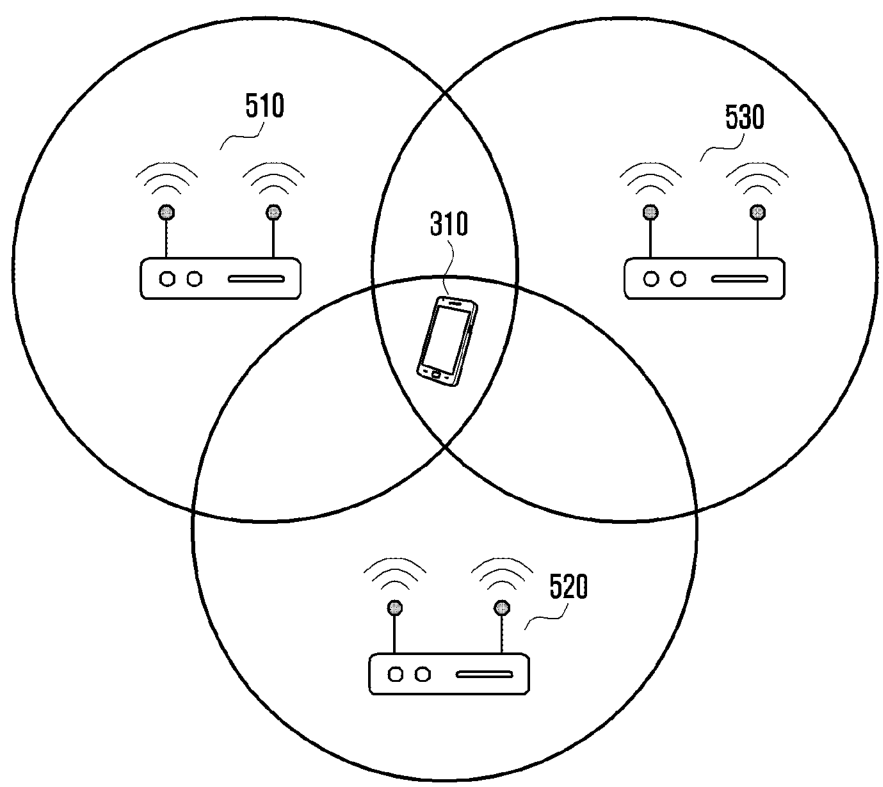
FIG. 5 illustrates an embodiment in which an electronic device according to various example embodiments determines whether to scan a channel in a first frequency band.

FIG. 5 illustrates an embodiment in which an electronic device according to various example embodiments determines whether to scan a channel in a first frequency band.

A short-range wireless communication system 500 illustrated in FIG. 5 may include an electronic device (e.g., the electronic device 310 of FIG. 4), a first external electronic device (e.g., the external electronic device 320 of FIG. 3) 510, a second external electronic device (e.g., the external electronic device 320 of FIG. 3) 520, and/or a third external electronic device (e.g., the external electronic device 320 of FIG. 3) 530.

The first external electronic device 510, the second external electronic device 520, and/or the third external electronic device 530 may support data transmission and reception through a first frequency band and/or a second frequency band. The first external electronic device 510, the second external electronic device 520, and/or the third external electronic device 530 may broadcast (or transmit) a signal (e.g., a beacon message or a probe response message) in the first frequency band, or may broadcast (or transmit) a signal (e.g., a beacon message or a probe response message) in the second frequency band.

The electronic device 310 may perform a scan using the second frequency band, and may receive a signal transmitted by the first external electronic device 510, a signal transmitted by the second external electronic device 520, and/or a signal transmitted by the third external electronic device 530 through the second frequency band.

The electronic device 310 may identify information related to short-range wireless communication included in the signal transmitted by the first external electronic device 510. The information related to the short-range wireless communication may include a reduced neighbor information (RNR) field. The RNR field may include channel information (e.g., a channel number) using a frequency band (e.g., the first frequency band) different from a frequency band (e.g., the second frequency band and/or a third frequency band) in which the information related to the short-range wireless communication is transmitted. The electronic device 310 may identify whether a channel using the first frequency band supported by the first external electronic device 510 is a preferred scanning channel (PSC) or a non-preferred scanning channel (non-PSC), based on the channel information.

The electronic device 310 may identify information related to short-range wireless communication included in the signal transmitted by the second external electronic device 520. The information related to the short-range wireless communication may include a reduced neighbor information (RNR) field. The RNR field may include channel information (e.g., a channel number) using a frequency band (e.g., the first frequency band) different from a frequency band (e.g., the second frequency band and/or a third frequency band) in which the information related to the short-range wireless communication is transmitted. The electronic device 310 may identify whether a channel using the first frequency band supported by the second external electronic device 520 is a preferred scanning channel (PSC) or a non-preferred scanning channel (non-PSC), based on the channel information.

The electronic device 310 may identify information related to short-range wireless communication included in the signal transmitted by the third external electronic device 530. The information related to the short-range wireless communication may include a reduced neighbor information (RNR) field. The RNR field may include channel information (e.g., a channel number) using a frequency band (e.g., the first frequency band) different from a frequency band (e.g., the second frequency band and/or a third frequency band) in which the information related to the short-range wireless communication is transmitted. The electronic device 310 may identify whether a channel using the first frequency band supported by the third external electronic device 530 is a preferred scanning channel (PSC) or a non-preferred scanning channel (non-PSC), based on the channel information.

In FIG. 5, for convenience of explanation, all channels in the first frequency band supported by the first external electronic device 510, the second external electronic device 520, and/or the third external electronic device 530 are assumed to be non-PSCs.

The electronic device 310 may measure the quality of the signal in the second frequency band transmitted by the first external electronic device 510, and may identify whether the quality of the signal satisfies a specified condition. Alternatively, the electronic device 310 may determine (or estimate) the strength of the signal in the first frequency band transmitted by the first external electronic device 510, based on the quality of the signal in the second frequency band and TPC information included in the information related to the short-range wireless communication.

The electronic device 310 may measure the quality of the signal in the second frequency band transmitted by the second external electronic device 520, and may identify whether the quality of the signal satisfies a specified condition. Alternatively, the electronic device 310 may determine (or estimate) the strength of the signal in the first frequency band transmitted by the second external electronic device 520, based on the quality of the signal in the second frequency band and TPC information included in the information related to the short-range wireless communication.

The electronic device 310 may measure the quality of the signal in the second frequency band transmitted by the third external electronic device 530, and may identify whether the quality of the signal satisfies a specified condition. Alternatively, the electronic device 310 may determine (or estimate) the strength of the signal in the first frequency band transmitted by the third external electronic device 530, based on the quality of the signal in the second frequency band and TPC information included in the information related to the short-range wireless communication.

For example, the strengths of the signals in the second frequency band measured by the electronic device 310 and the strengths of the signals in the first frequency band determined by the electronic device 310 may be as shown below in Table 2.

TABLE 2

| | Strength of signal in first frequency band | Strength of signal in second frequency band |
|---|---|---|
| First external electronic device (510) | −90 dBm | −80 dBm |
| Second external electronic device (520) | −90 dBm | −80 dBm |
| Third external electronic device (530) | −55 dBm | −45 dBm |

The electronic device 310 may identify that the strength (−90 dBm) of the signal in the first frequency band that the first external electronic device 510 may transmit is less than a specified value (e.g., −75 dBm), and may determine not to scan a channel in the first frequency band included in the information related to the short-range wireless communication transmitted by the first external electronic device 510. Alternatively, the electronic device 310 may identify that the strength (−85 dBm) of the signal in the second frequency band transmitted by the first external electronic device 510 is less than the specified value (e.g., −75 dBm), and may determine not to scan the channel in the first frequency band included in the information related to the short-range wireless communication transmitted by the first external electronic device 510.

The electronic device 310 may identify that the strength (−90 dBm) of the signal in the first frequency band that the second external electronic device 520 may transmit is less than the specified value (e.g., −75 dBm), and may determine not to scan a channel in the first frequency band included in the information related to the short-range wireless communication transmitted by the second external electronic device 520. Alternatively, the electronic device 310 may identify that the strength (−85 dBm) of the signal in the second frequency band transmitted by the second external electronic device 520 is less than the specified value (e.g., −75 dBm), and may determine not to scan the channel in the first frequency band included in the information related to the short-range wireless communication transmitted by the second external electronic device 520.

The electronic device 310 may identify that the strength (−55 dBm) of the signal in the first frequency band that the third external electronic device 530 may transmit is equal to or greater than the specified value (e.g., −75 dBm), and may determine to scan a channel in the first frequency band included in the information related to the short-range wireless communication transmitted by the third external electronic device 530. Alternatively, the electronic device 310 may identify that the strength (−45 dBm) of the signal in the second frequency band transmitted by the third external electronic device 530 is equal to or greater than the specified value (e.g., −75 dBm), and may determine to scan the channel in the first frequency band included in the information related to the short-range wireless communication transmitted by the third external electronic device 530.

A situation may occur in which the channel in the first frequency band supported by the second external electronic device 520 and the channel in the first frequency band supported by the third external electronic device 530 are the same. In this case, the electronic device 310 may not scan the channel in the first frequency band supported by the second external electronic device 520, but may scan the channel in the first frequency band supported by the third external electronic device 530.

Each embodiment herein may be used in combination with any other embodiment described herein.

Figure 6:
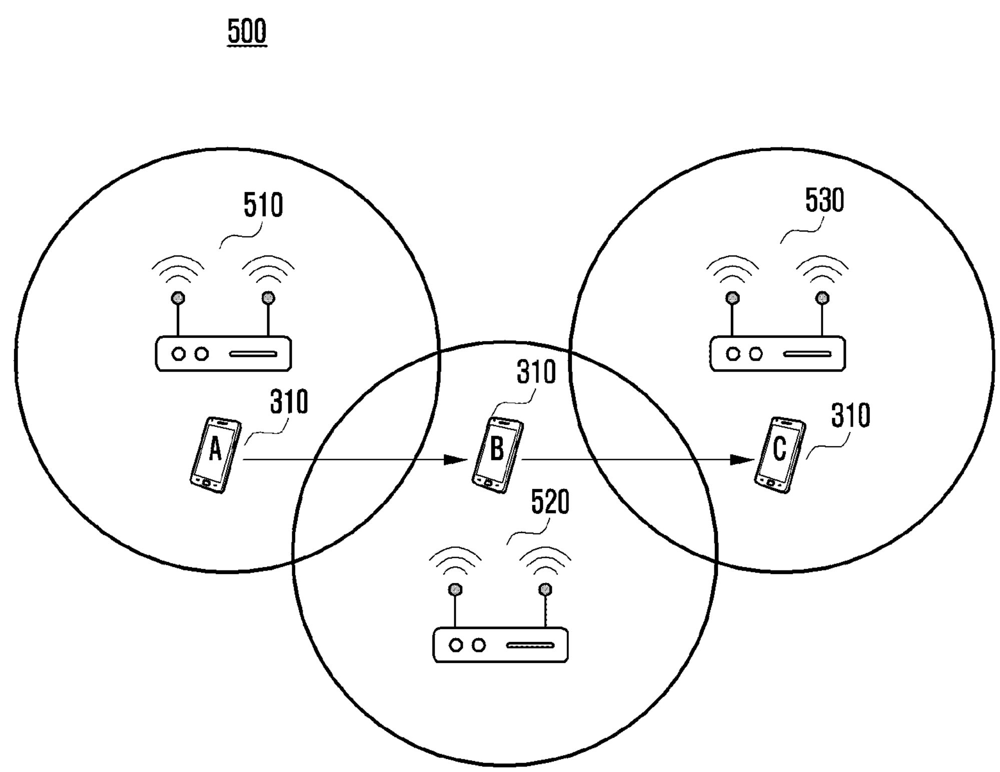
FIG. 6 illustrates an embodiment in which an electronic device according to various example embodiments determines whether to scan a channel in a first frequency band while performing a handover.

FIG. 6 illustrates an embodiment in which an electronic device according to various example embodiments determines whether to scan a channel in a first frequency band while performing a handover.

A short-range wireless communication system 500 illustrated in FIG. 6 may include an electronic device (e.g., the electronic device 310 of FIG. 4), a first external electronic device (e.g., the external electronic device 320 of FIG. 3) 510, a second external electronic device (e.g., the external electronic device 320 of FIG. 3) 520, and/or a third external electronic device (e.g., the external electronic device 320 of FIG. 3) 530.

The first external electronic device 510, the second external electronic device 520, and/or the third external electronic device 530 may support data transmission and reception through a first frequency band and/or a second frequency band. The first external electronic device 510, the second external electronic device 520, and/or the third external electronic device 530 may broadcast (or transmit) a signal (e.g., a beacon message or a probe response message) in the first frequency band, or may broadcast (or transmit) a signal (e.g., a beacon message or a probe response message) in the second frequency band.

When the electronic device (e.g., the electronic device 310 of FIG. 4) is present in position A, the electronic device 310 may scan an external electronic device (e.g., the first external electronic device 510 of FIG. 5) to perform short-range wireless communication with.

The electronic device 310 may perform a scan using the second frequency band, and may receive a signal transmitted by the first external electronic device 510 through the second frequency band.

The electronic device 310 may identify information related to short-range wireless communication included in the signal transmitted by the first external electronic device 510. The information related to the short-range wireless communication may include a reduced neighbor information (RNR) field. The RNR field may include channel information (e.g., a channel number) using a frequency band (e.g., the first frequency band) different from a frequency band (e.g., the second frequency band and/or a third frequency band) in which the information related to the short-range wireless communication is transmitted. The electronic device 310 may identify whether a channel using the first frequency band supported by the first external electronic device 510 is a preferred scanning channel (PSC) or a non-preferred scanning channel (non-PSC), based on the channel information.

When identifying that the channel using the first frequency band supported by the first external electronic device 510 is a non-PSC, the electronic device 310 may determine whether to scan the channel using the first frequency band.

The electronic device 310 may measure the quality of the signal in the second frequency band transmitted by the first external electronic device 510, and may identify whether the quality of the signal satisfies a specified condition. Alternatively, the electronic device 310 may determine (or estimate) the strength of the signal in the first frequency band transmitted by the first external electronic device 510, based on the quality of the signal in the second frequency band and TPC information included in the information related to the short-range wireless communication.

The electronic device 310 may identify that the strength (−48 dBm) of the signal in the first frequency band that the first external electronic device 510 may transmit is equal to or greater than a specified value (e.g., −75 dBm), and may determine to scan a channel in the first frequency band included in the information related to the short-range wireless communication transmitted by the first external electronic device 510. Alternatively, the electronic device 310 may identify that the strength (−38 dBm) of the signal in the second frequency band transmitted by the first external electronic device 510 is equal to or greater than the specified value (e.g., −75 dBm), and may determine to scan the channel in the first frequency band included in the information related to the short-range wireless communication transmitted by the first external electronic device 510.

The electronic device 310 may scan the channel in the first frequency band, and may be connected, directly or indirectly, to the first external electronic device 510 through the short-range wireless communication through the first frequency band.

When the electronic device 310 moves from position A to position B, the distance between the electronic device 310 and the first external electronic device 510 may increase, and the quality of the signal transmitted by the first external device 510, measured by the electronic device 310, may be reduced. When identifying that the quality of the signal transmitted by the first external electronic device 510 is less than or equal to the specified value, the electronic device 310 releases the connection with the first external electronic device 510 through the channel in the first frequency band, and may scan an external electronic device (e.g., the second external electronic device 520 of FIG. 5) to perform short-range wireless communication with.

The electronic device 310 may perform a scan using the second frequency band, and may receive a signal transmitted by the second external electronic device 520 through the second frequency band.

The electronic device 310 may identify information related to short-range wireless communication included in the signal transmitted by the second external electronic device 520. The information related to the short-range wireless communication may include a reduced neighbor information (RNR) field. The RNR field may include channel information (e.g., a channel number) using a frequency band (e.g., the first frequency band) different from a frequency band (e.g., the second frequency band and/or a third frequency band) in which the information related to the short-range wireless communication is transmitted. The electronic device 310 may identify whether a channel using the first frequency band supported by the second external electronic device 520 is a preferred scanning channel (PSC) or a non-preferred scanning channel (non-PSC), based on the channel information.

When identifying that the channel using the first frequency band supported by the second external electronic device 520 is a non-PSC, the electronic device 310 may determine whether to scan the channel using the first frequency band.

The electronic device 310 may measure the quality of the signal in the second frequency band transmitted by the second external electronic device 520, and may identify whether the quality of the signal satisfies a specified condition. Alternatively, the electronic device 310 may determine (or estimate) the strength of the signal in the first frequency band transmitted by the second external electronic device 520, based on the quality of the signal in the second frequency band and TPC information included in the information related to the short-range wireless communication.

The electronic device 310 may identify that the strength (−90 dBm) of the signal in the first frequency band that the second external electronic device 520 may transmit is less than or equal to the specified value (e.g., −75 dBm), and may determine not to scan a channel in the first frequency band included in the information related to the short-range wireless communication transmitted by the second external electronic device 520. Alternatively, the electronic device 310 may identify that the strength (−85 dBm) of the signal in the second frequency band transmitted by the second external electronic device 520 is less than or equal to the specified value (e.g., −75 dBm), and may determine not to scan the channel in the first frequency band included in the information related to the short-range wireless communication transmitted by the second external electronic device 520.

When determining not to scan the channel in the first frequency band, the electronic device 310 may determine whether to establish the short-range wireless communication through the channel in the second frequency band, based on whether the signal transmitted through the channel of the second frequency band is equal to or greater than the specified value. When the signal transmitted through the channel in the second frequency band is equal to or greater than the specified value, the electronic device 310 may establish the short-range wireless communication through the channel in the second frequency band. When the signal transmitted through the channel in the second frequency band is less than or equal to the specified value, the electronic device 310 may perform data communication through a cellular network.

As the electronic device 310 moves from position B to position C, the electronic device 310 may scan an external electronic device (e.g., the third external electronic device 530 of FIG. 5) to perform short-range wireless communication with.

The electronic device 310 may perform a scan using the second frequency band, and may receive a signal transmitted by the third external electronic device 530 through the second frequency band.

The electronic device 310 may identify information related to short-range wireless communication included in the signal transmitted by the third external electronic device 530. The information related to the short-range wireless communication may include a reduced neighbor information (RNR) field. The RNR field may include channel information (e.g., a channel number) using a frequency band (e.g., the first frequency band) different from a frequency band (e.g., the second frequency band and/or a third frequency band) in which the information related to the short-range wireless communication is transmitted. The electronic device 310 may identify whether a channel using the first frequency band supported by the third external electronic device 530 is a preferred scanning channel (PSC) or a non-preferred scanning channel (non-PSC), based on the channel information.

When identifying that the channel using the first frequency band supported by the third external electronic device 530 is a PSC, the electronic device 310 may determine to scan the channel using the first frequency band.

An electronic device according to various example embodiments may include: a communication circuit configured to perform short-range wireless communication through a first frequency band and/or a second frequency band lower than the first frequency band; and a processor, wherein the processor may be configured to identify whether a channel in the first frequency band is a non-preferred scanning channel (non-PSC), based on reduced neighbor report (RNR) information included in a signal received through the second frequency band from an external electronic device, determine a quality of a signal to be received through the first frequency band, based on transmit power control (TPC) information transmitted by the external electronic device upon identifying that the channel in the first frequency band is the non-PSC, and determine whether to perform an operation of scanning the non-PSC, based on whether a quality of a signal to be transmitted through the first frequency band satisfies a specified condition.

In the electronic device according to various example embodiments, the processor may be configured to determine the quality of the signal to be received through the first frequency band, based on an output strength of a signal in the first frequency band maximally outputtable by the electronic device and a path loss of the signal in the first frequency band.

In the electronic device according to various example embodiments, the processor may be configured to determine a path loss of the signal received through the second frequency band, based on an output strength of the signal through the second frequency and a quality of the signal received through the second frequency band, based on the TPC information, and determine the path loss of the signal in the first frequency band, based on the first frequency band, the second frequency band, and the determined path loss.

In the electronic device according to various example embodiments, the specified condition may include a condition that the quality of the signal is equal to or greater than a specified value.

In the electronic device according to various example embodiments, the processor may be configured to perform an operation of scanning the channel upon identifying that the channel is a preferred scanning channel (PSC), based on the RNR information.

In the electronic device according to various example embodiments, the processor may be configured to display an indicator indicating that an operation of scanning the channel is not performed on a display, based on determining not to perform the operation of scanning the channel.

In the electronic device according to various example embodiments, the processor may obtain the RNR information and/or the TPC information through an operation of scanning the channel through the second frequency band.

In the electronic device according to various example embodiments, the first frequency band may be a 6 GHZ band, and the second frequency band may be a 5 GHz band or a 2.4 GHz band.

An electronic device according to various example embodiments may include: a communication circuit configured to perform short-range wireless communication through a first frequency band and/or a second frequency band lower than the first frequency band; and a processor, wherein the processor may be configured to identify whether a channel in the first frequency band is a non-preferred scanning channel (non-PSC), based on reduced neighbor report (RNR) information included in a signal received through the second frequency band from an external electronic device, determine a quality of a signal received through the second frequency band, upon identifying that the channel in the first frequency band is the non-PSC, and determine whether to perform an operation of scanning the channel, based on whether the quality of the signal received through the second frequency band satisfies a specified condition.

In the electronic device according to various example embodiments, the specified condition may include a condition that the quality of the signal is equal to or greater than a specified value.

In the electronic device according to various example embodiments, the processor may be configured to perform the operation of scanning the channel upon identifying that the channel is a preferred scanning channel (PSC), based on the RNR information.

In the electronic device according to various example embodiments, the processor may be configured to display an indicator indicating that an operation of scanning the channel is not performed on a display, based on determining not to perform the operation of scanning the channel.

In the electronic device according to various example embodiments, the first frequency band may be a 6 GHZ band, and the second frequency band may be a 5 GHz band or a 2.4 GHz band.

Figure 7:
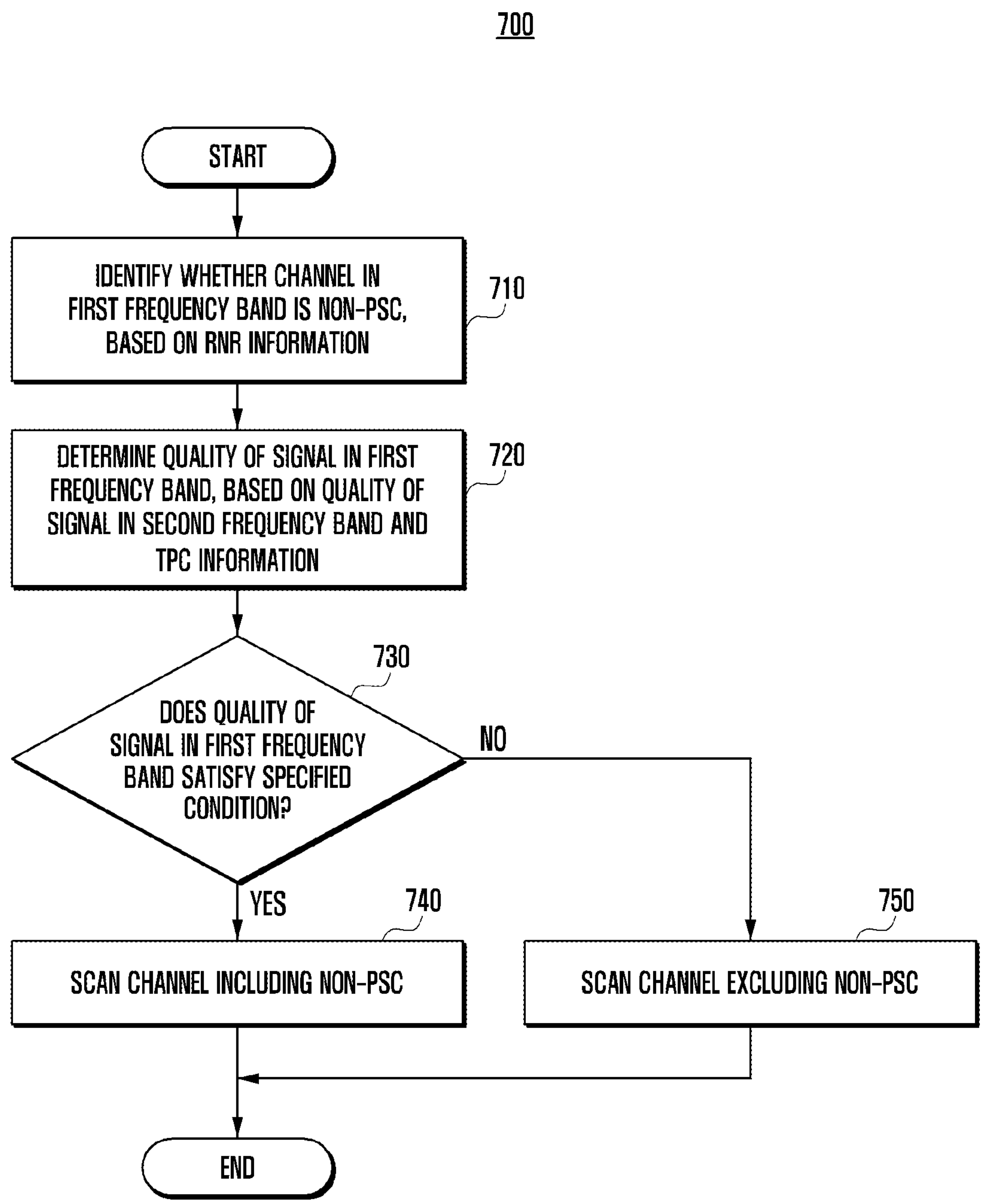
FIG. 7 is an operation flowchart illustrating an operating method of an electronic device according to various example embodiments.

FIG. 7 is an operation flowchart illustrating an operating method 700 of an electronic device according to various example embodiments.

In operation 710, an electronic device (e.g., the electronic device 310 of FIG. 4) may determine whether a channel in a first frequency band is a non-preferred scanning channel (non-PSC), based on RNR information.

The electronic device 310 may perform a scan using a second frequency band, and may receive a signal transmitted by an external electronic device (e.g., the external electronic device 320 of FIG. 3) through the second frequency band. The electronic device 310 may identify information related to short-range wireless communication included in the signal transmitted by the external electronic device 320.

The information related to the short-range wireless communication may include a reduced neighbor information (RNR) field. The RNR field may include channel information (e.g., a channel number) using a frequency band (e.g., the first frequency band) different from a frequency band (e.g., the second frequency band and/or a third frequency band) in which the information related to the short-range wireless communication is transmitted. The processor 420 may identify whether a channel using the first frequency band supported by the external electronic device 320 is a preferred scanning channel (PSC) or a non-preferred scanning channel (non-PSC), based on the channel information.

When identifying that the channel using the first frequency band is a non-PSC, the electronic device 310 may determine whether to scan the channel using the first frequency band.

In operation 720, the electronic device 310 may determine (or estimate) the quality of a signal in the first frequency band, based on the quality of the signal in the second frequency band and transmit power control (TPC) information.

When determining whether to scan the channel using the first frequency band, the electronic device 310 may determine (or estimate) the quality of a signal to be transmitted through the channel in the first frequency band. The electronic device 310 may determine (or estimate) the quality of the signal to be transmitted through the first frequency band, based on the quality of the signal received through the second frequency band and the transmit power control (TPC) information included in the information related to the short-range wireless communication transmitted by the external electronic device 320.

The electronic device 310 may determine the reception strength (or quality) of the signal in the first frequency band, based on the output strength of the signal in the first frequency band that the electronic device 310 can maximally output and the path loss of the signal in the first frequency band.

The electronic device 310 may determine the path loss of the signal in the first frequency band, based on the path loss of the signal in the second frequency band, the first frequency band, and/or the second frequency band.

The electronic device 310 may determine the path loss of the signal in the second frequency band, based on the difference between the output strength of the signal in the second frequency band and the reception strength of the signal in the second frequency band. The transmit power control (TPC) information included in the information related to the short-range wireless communication transmitted by the external electronic device 320 may include the output strength of the signal in the second frequency band. The electronic device 310 may identify the output strength of the signal in the second frequency band, based on the TPC information, and may determine the difference between the reception strength and the output strength of a signal in the second frequency band received by the electronic device 310 in as the path loss of the signal in the first frequency band.

The electronic device 310 may determine the path loss of the signal in the first frequency band, based on the determined path loss of the signal in the second frequency band and Equation 2. The electronic device 310 may determine (or estimate) the reception strength (or quality) of the signal in the first frequency band, based on the path loss of the signal in the first frequency band and the maximum output strength of the signal in the first frequency band.

In operation 730, the electronic device 310 may identify whether the quality of the signal in the first frequency band satisfies a specified condition.

The electronic device 310 may identify the quality of a signal that may be received through the channel in the first frequency band, and may identify whether the quality of the signal satisfies the specified condition. The specified condition may include a condition that the quality of the signal is equal to or greater than (or exceeds) a specified value.

For example, when identifying that the quality (e.g., −50 dBm) of the signal that may be received through the channel in the first frequency band is equal to or greater than the specified value (e.g., −70 dBm), the electronic device 310 may determine that the quality of the signal satisfies the specified condition.

In another example, when identifying that the quality (e.g., −80 dBm) of the signal that may be received through the channel in the first frequency band is equal to or lower than the specified value (e.g., −70 dBm), the electronic device 310 may determine that the quality of the signal does not satisfy the specified condition.

The electronic device 310 may determine whether to scan the channel using the first frequency band, based on whether the quality of the signal satisfies the specified condition.

In operation 740, the electronic device 310 may scan the channel including a non-PSC, based on the quality of the signal in the first frequency band satisfying the specified condition (Y in operation 730).

When identifying that the quality of the signal satisfies the specified condition, the electronic device 310 may determine to scan the channel using the first frequency band. The electronic device 310 may add the frequency band of the non-PSC (part of the first frequency band) to the frequency band to be scanned. When determining to scan the channel using the first frequency band, the electronic device 310 may configure components (e.g., a low-noise amplifier and a filter) of the communication circuit 410 to receive a signal in the first frequency band, and may receive a signal in the first frequency band transmitted by the external electronic device 320. The electronic device 310 may perform operations (e.g., authentication and/or association) related to establishment of a channel in the first frequency band, based on information related to short-range communication included in the signal in the first frequency band.

In operation 750, the electronic device 310 may scan a channel other than the non-PSC, based on the quality of the signal in the first frequency band not satisfying the specified condition (N in operation 730).

When identifying that the quality of the signal does not satisfy the specified condition, the electronic device 310 may determine not to scan the non-PSC channel. The electronic device 310 may scan a frequency band other than the frequency band corresponding to the non-PSC. The electronic device 310 may display an indicator indicating that the channel using the first frequency band is not scanned on the display (e.g., the display module 160 of FIG. 1).

Figure 8:
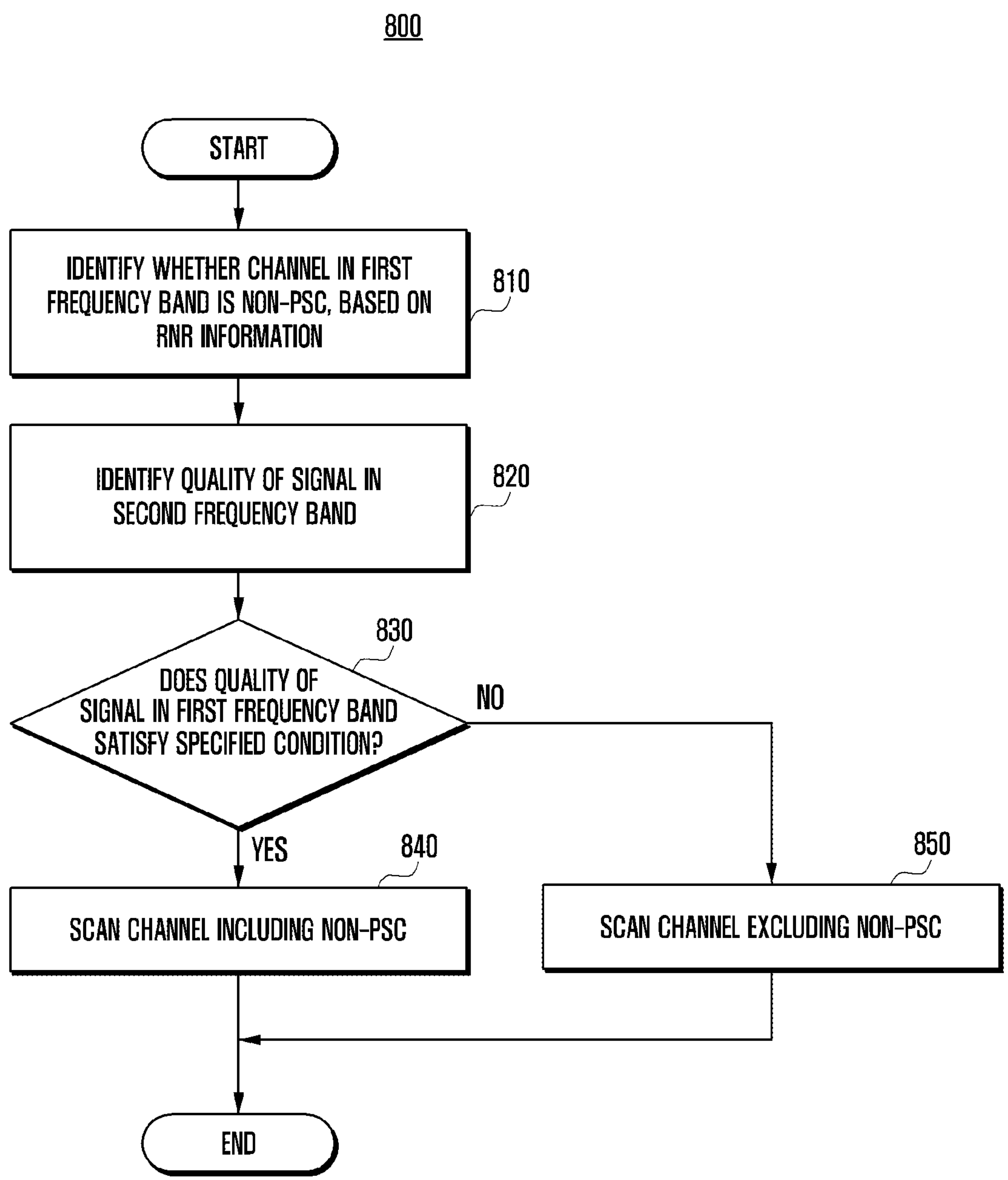
FIG. 8 is an operation flowchart illustrating an operating method of an electronic device according to various example embodiments.

FIG. 8 is an operation flowchart illustrating an operating method 800 of an electronic device according to various example embodiments.

In operation 810, an electronic device (e.g., the electronic device 310 of FIG. 4) may determine whether a channel in a first frequency band is a non-preferred scanning channel (non-PSC), based on RNR information.

The electronic device 310 may perform a scan using a second frequency band, and may receive a signal transmitted by an external electronic device (e.g., the external electronic device 320 of FIG. 3) through the second frequency band. The electronic device 310 may identify information related to short-range wireless communication included in the signal transmitted by the external electronic device 320.

The information related to the short-range wireless communication may include a reduced neighbor information (RNR) field. The RNR field may include channel information (e.g., a channel number) using a frequency band (e.g., the first frequency band) different from a frequency band (e.g., the second frequency band and/or a third frequency band) in which the information related to the short-range wireless communication is transmitted. The processor 420 may identify whether a channel using the first frequency band supported by the external electronic device 320 is a preferred scanning channel (PSC) or a non-preferred scanning channel (non-PSC), based on the channel information.

When identifying that the channel using the first frequency band is a non-PSC, the electronic device 310 may determine whether to scan the channel using the first frequency band.

In operation 820, the electronic device 310 may identify the quality of the signal in the second frequency band.

When determining whether to scan the channel using the first frequency band, the processor 420 may identify the quality of the signal received through a channel in the second frequency band. The quality of the signal may include a received signal strength indicator (RSSI).

The first frequency band may be a higher frequency band than the second frequency band. Since a signal having a relatively high frequency has greater attenuation than a signal having a relatively low frequency, a signal received through a channel in the first frequency band may have a lower quality than a signal received through a channel in the second frequency band. Since the processor 420 does not scan the channel using the first frequency band, the processor 420 may determine whether to scan a channel in the first frequency band, based on the quality of the signal received through the channel in the second frequency band.

In operation 830, the electronic device 310 may identify whether the quality of the signal in the second frequency band satisfies a specified condition.

The processor 420 may identify the quality of the signal received through the channel in the second frequency band, and may identify whether the quality of the signal satisfies the specified condition. The specified condition may include a condition that the quality of the signal is equal to or greater than (or exceeds) a specified value. For example, when identifying that the quality (e.g., −50 dBm) of the signal received through the channel in the second frequency band is equal to or greater than the specified value (e.g., −70 dBm), the processor 420 may determine that the quality of the signal satisfies the specified condition. In another example, when identifying that the quality (e.g., −80 dBm) of the signal received through the channel in the second frequency band is equal to or lower than the specified value (e.g., −70 dBm), the processor 420 may determine that the quality of the signal does not satisfy the specified condition.

The electronic device 310 may determine whether to scan the channel using the first frequency band, based on whether the quality of the signal satisfies the specified condition.

In operation 840, the electronic device 310 may scan the channel including a non-PSC, based on the quality of the signal in the first frequency band satisfying the specified condition (Y in operation 830).

When identifying that the quality of the signal satisfies the specified condition, the electronic device 310 may determine to scan the channel using the first frequency band. The electronic device 310 may add the frequency band of the non-PSC (part of the first frequency band) to the frequency band to be scanned. When determining to scan the channel using the first frequency band, the electronic device 310 may configure components (e.g., a low-noise amplifier and/or a filter) of the communication circuit 410 to receive a signal in the first frequency band, and may receive a signal in the first frequency band transmitted by the external electronic device (e.g., 320). The electronic device 310 may perform operations (e.g., authentication and/or association) related to establishment of a channel in the first frequency band, based on information related to short-range communication included in the signal in the first frequency band.

In operation 850, the electronic device 310 may scan a channel other than the non-PSC, based on the quality of the signal in the first frequency band not satisfying the specified condition (N in operation 830).

When identifying that the quality of the signal does not satisfy the specified condition, the electronic device 310 may determine not to scan the non-PSC channel. The electronic device 310 may scan a frequency band other than the frequency band corresponding to the non-PSC. The electronic device 310 may display an indicator indicating that the channel using the first frequency band is not scanned on the display (e.g., the display module 160 of FIG. 1).

An operating method of an electronic device according to various example embodiments may include: identifying, from an external electronic device, whether a channel using a first frequency band is a non-preferred scanning channel (non-PSC), based on reduced neighbor report (RNR) information included in a signal received through a second frequency band from the external electronic device; determining a quality of a signal to be received through the first frequency band, based on transmit power control (TPC) information transmitted by the external electronic device upon identifying that the channel is the non-PSC; and determining whether to perform scanning of the channel, based on whether a quality of a signal to be transmitted through the first frequency band satisfies a specified condition.

In the operating method of the electronic device according to various example embodiments, the determining of the quality of the signal to be received through the first frequency band may include determining the quality of the signal to be received through the first frequency band, based on an output strength of a signal in the first frequency band maximally outputtable by the electronic device and a path loss of the signal in the first frequency band.

In the operating method of the electronic device according to various example embodiments, the determining of the quality of the signal to be received through the first frequency band may further include: determining a path loss of the signal received through the second frequency band, based on an output strength of the signal through the second frequency and a quality of the signal received through the second frequency band, based on the TPC information; and determining the path loss of the signal in the first frequency band, based on the first frequency band, the second frequency band, and the determined path loss. "Based on" as used herein covers based at least on.

The operating method of the electronic device according to various example embodiments may further include performing scanning of the channel upon identifying that the channel is a PSC, based on the RNR information.

The operating method of the electronic device according to various example embodiments may further include displaying an indicator indicating that scanning of the channel is not performed on a display upon determining not to perform the operation of scanning the channel.

The operating method of the electronic device according to various example embodiments may further include obtaining the RNR information and/or the TPC information through an operation of scanning the channel through the second frequency band.

In the operating method of the electronic device according to various example embodiments, the first frequency band may be a 6 GHZ band, and the second frequency band may be a 5 GHz band or a 2.4 GHz band.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 and/or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

communication circuitry configured to perform short-range wireless communication via a first frequency band and/or a second frequency band lower than the first frequency band; and at least one processor, memory storing instructions, and wherein the instructions, when executed by the at least one processor individually and/or collectively, cause the electronic device to:

receive, via the second frequency band, a signal including reduced neighbor report (RNR) information and transmit power control (TPC) information from an external electronic device, identify whether the RNR information includes information on a non-preferred scanning channel (non-PSC) of the first frequency band; and in a case that the RNR information includes the information on the non-PSC of the first frequency band:

determine a quality of a signal to be received via the first frequency band, based on the TPC information and a quality of the signal received via the second frequency band; and perform scanning the non-PSC of the first frequency band, based at least part on that the quality of the signal to be received via the first frequency band satisfying a specified condition.

2. The electronic device of claim 1, wherein the instructions, when executed by the at least one processor individually and/or collectively, cause the electronic device to determine the quality of the signal to be received via the first frequency band, based on an output strength of a signal in the first frequency band outputtable by the electronic device and a path loss of the signal in the first frequency band.

3. The electronic device of claim 2, wherein the instructions, when executed by the at least one processor individually and/or collectively, cause the electronic device to:

determine a path loss of the signal received via the second frequency band, based on an output strength of the signal via the second frequency and a quality of the signal received via the second frequency band, based on the TPC information; and determine the path loss of the signal in the first frequency band, based on the first frequency band, the second frequency band, and the determined path loss.

4. The electronic device of claim 1, wherein the specified condition comprises a condition that the quality of the signal is equal to or greater than a specified value.

5. The electronic device of claim 1, wherein the instructions, when executed by the at least one processor individually and/or collectively, cause the electronic device to refrain the communication circuitry from scanning the non-PSC of the first frequency band based at least part on that the quality of the signal to be received via the first frequency band does not satisfy the specified condition.

6. The electronic device of claim 1, wherein the instructions, when executed by the at least one processor individually and/or collectively, cause the electronic device to control a display to display an indicator indicating that an operation of scanning the channel is not performed, based on determining not to perform the operation of scanning the channel.

7. The electronic device of claim 1, wherein the instructions, when executed by the at least one processor individually and/or collectively, cause the electronic device is configured to obtain the RNR information and/or the TPC information via an operation comprising scanning the channel via the second frequency band.

8. The electronic device of claim 1, wherein the first frequency band is a 6 GHZ band, and the second frequency band is a 5 GHz band or a 2.4 GHz band.

9. An operating method of an electronic device for performing short-range wireless communication via a first frequency band and/or a second frequency band lower than the first frequency band, the method comprising:

receiving, via the second frequency band, a signal including reduced neighbor report (RNR) information and transmit power control (TPC) information from an external electronic device, identifying whether the RNR information includes information on a non-preferred scanning channel (non-PSC) of the first frequency band; and in a case that the RNR information includes the information on the non-PSC of the first frequency band:

determining a quality of a signal to be received via the first frequency band, based on the TPC information and a quality of the signal received via the second frequency band; and performing scanning of the non-PSC of the first frequency band, based at least part on that the quality of the signal to be received via the first frequency band satisfying a specified condition.

10. The method of claim 9, wherein the determining of the quality of the signal to be received via the first frequency band comprises determining the quality of the signal to be received via the first frequency band, based on an output strength of a signal in the first frequency band maximally outputtable by the electronic device and a path loss of the signal in the first frequency band.

11. The method of claim 10, wherein the determining of the quality of the signal to be received via the first frequency band further comprises:

determining a path loss of the signal received via the second frequency band, based on an output strength of the signal via the second frequency and a quality of the signal received via the second frequency band, based on the TPC information; and determining the path loss of the signal in the first frequency band, based on the first frequency band, the second frequency band, and the determined path loss.

12. The method of claim 9, further comprising:

refraining a communication circuitry of the electronic device from scanning the non-PSC of the first frequency band based at least part on that the quality of the signal to be received via the first frequency band does not satisfy the specified condition.

13. The method of claim 9, further comprising:

displaying an indicator indicating that scanning of the channel is not performed, on a display, upon determining not to perform scanning of the channel.

14. The method of claim 9, further comprising:

obtaining the RNR information and/or the TPC information through an operation of scanning the channel via the second frequency band.

15. The method of claim 9, wherein the first frequency band is a 6 GHZ band, and the second frequency band is a 5 GHz band or a 2.4 GHz band.

16. An electronic device comprising:

communication circuitry configured to perform short-range wireless communication via a first frequency band and/or a second frequency band lower than the first frequency band; and at least one processor;

memory storing instructions, wherein the instructions, when executed by the at least one processor individually and/or collectively, cause the electronic device to:

receive, via the second frequency band, a signal including reduced neighbor report (RNR) information and transmit power control (TPC) information from an external electronic device, identify whether the RNR information includes information on a non-preferred scanning channel (non-PSC) of the first frequency band;

in a case that the RNR information includes the information on the non-PSC of the first frequency band:

determine a quality of a signal received via the second frequency band; and perform scanning the non-PSC of the first frequency band, based at least part on that the quality of the signal received via the second frequency band satisfying a specified condition.

17. The electronic device of claim 16, wherein the specified condition comprises a condition that the quality of the signal is equal to or greater than a specified value.

18. The electronic device of claim 16, wherein the instructions, when executed by the at least one processor individually and/or collectively, cause the electronic device to refrain the communication circuitry from scanning the non-PSC of the first frequency band based at least part on that the quality of the signal received via the second frequency band does not satisfy the specified condition.

19. The electronic device of claim 16, wherein the instructions, when executed by the at least one processor individually and/or collectively, cause the electronic device to control a display to display an indicator indicating that an operation of scanning the channel is not performed, based on determining not to perform the operation of scanning the channel.

20. The electronic device of claim 16, wherein the first frequency band is a 6 HZ band, and the second frequency band is a 5 GHz band or a 2.4 GHz band.

* * * * *